July 11, 1950 E. A. SCHRYBER 2,515,097
APPARATUS FOR FEEDING FLUX AND SOLDER
Filed April 10, 1946 2 Sheets-Sheet 1
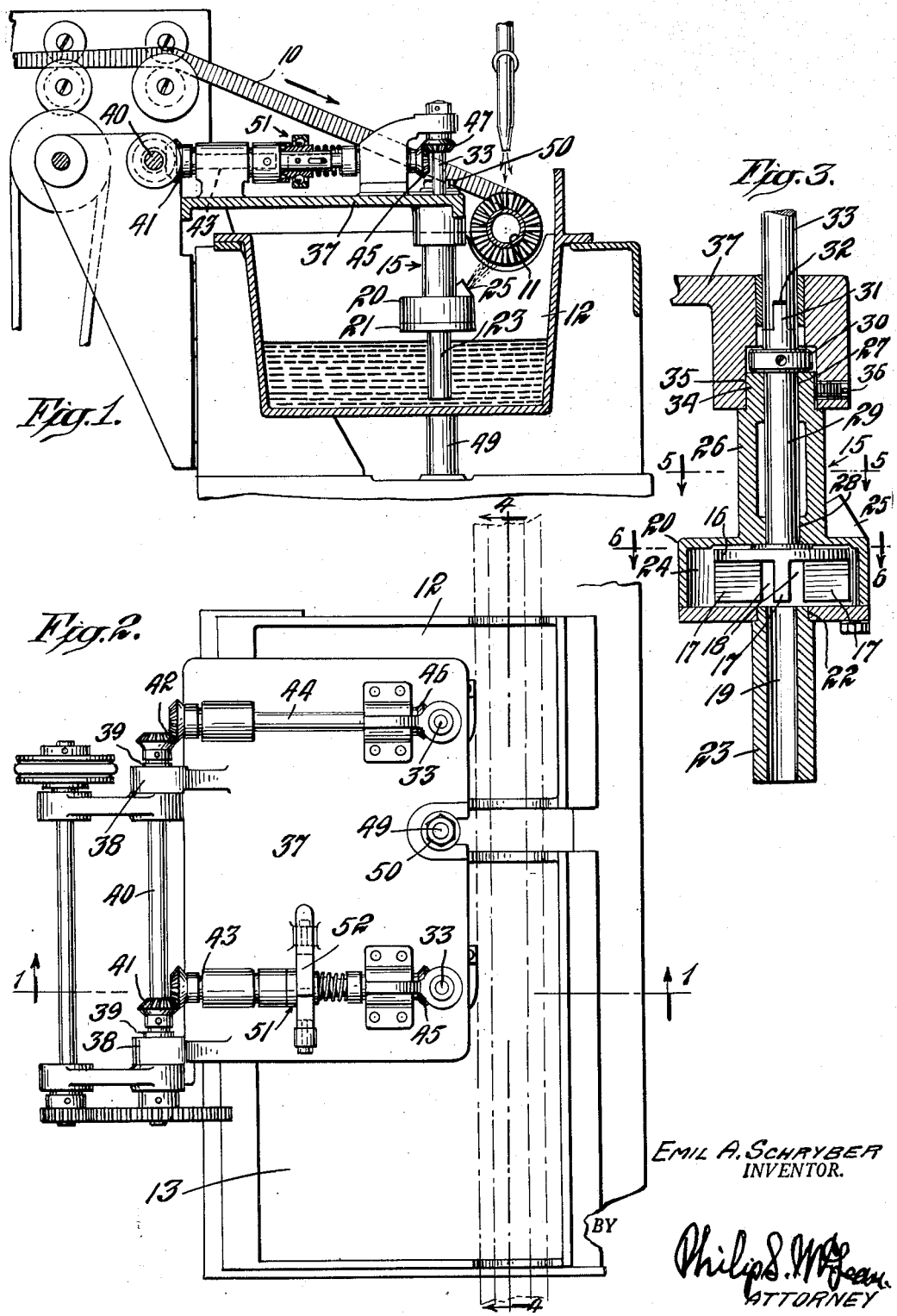
Emil A. Schryber
INVENTOR.
BY Philip S. McLean
ATTORNEY July 11, 1950 E. A. SCHRYBER 2,515,097
APPARATUS FOR FEEDING FLUX AND SOLDER
Filed April 10, 1946 2 Sheets-Sheet 2
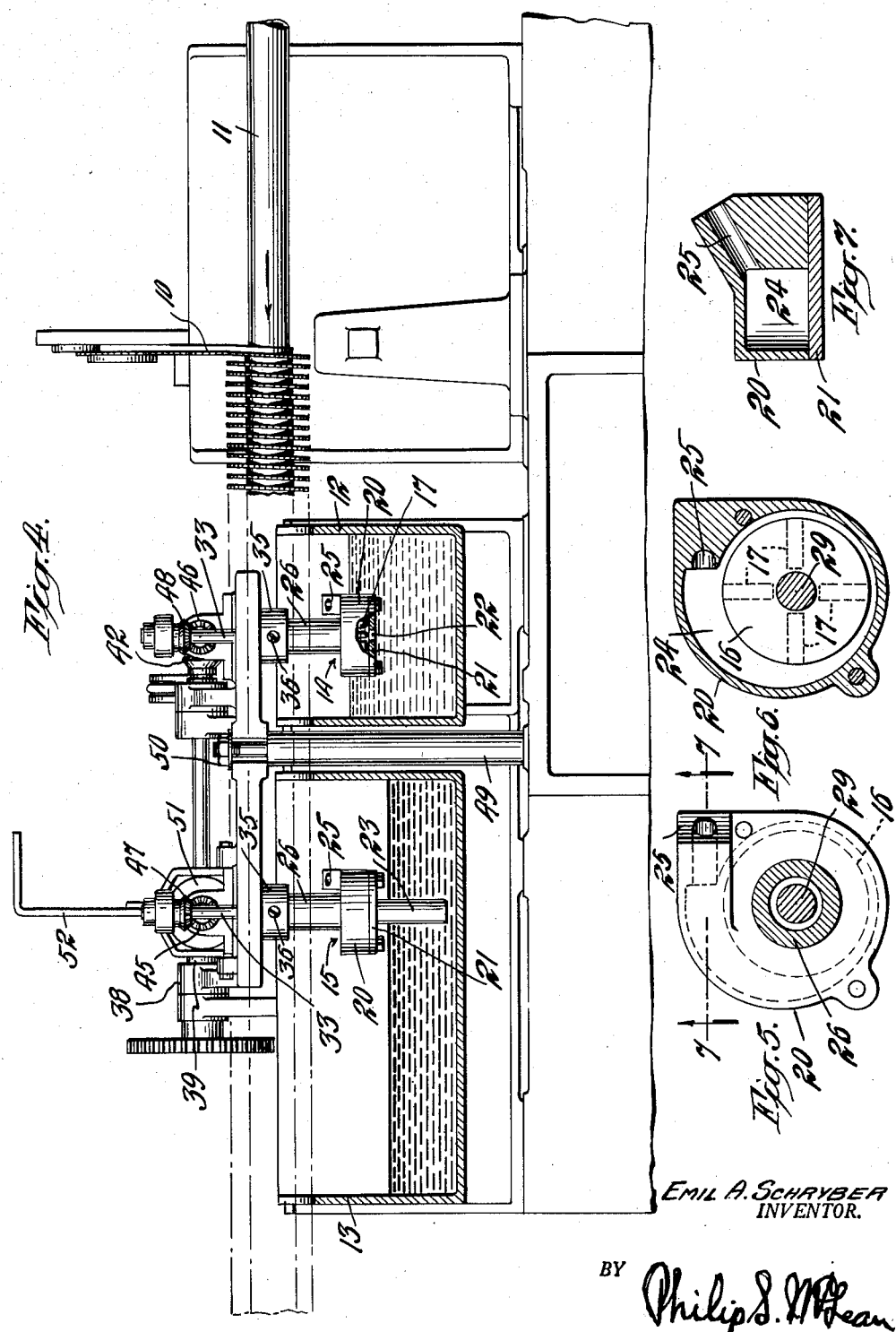
Emil A. Schryber
INVENTOR.
BY Philip S. McLean
ATTORNE Patented July 11, 1950

2,515,097

UNITED STATES PATENT OFFICE 2,515,097

APPARATUS FOR FEEDING FLUX AND SOLDER

Emil A. Schryber, Lynbrook, N. Y., assignor to Extended Surface Division of David E. Kennedy, Inc., Brooklyn, N. Y., a corporation of New York Application April 10, 1946, Serial No. 661,033

2 Claims. (Cl. 113—59)

1

The invention herein disclosed relates to the manufacture of finned tubing, particularly as disclosed in the E. F. Tilley Patent No. 2,251,642 of August 5, 1941, in which a slitted strip of fin material is wound helically upon a tube and secured by a soldering operation.

The present invention is concerned particularly with the soldering or tinning operations.

Special objects of the invention are to provide pumps for applying the flux and solder to the finned tubing, which will operate efficiently under the acid and heat conditions incidental to such operations and which, if required, may be quickly and easily removed and replaced.

Related objects are to so mount the pump mechanism that the individual pumps can be quickly and easily inspected, clear of the acid flux and the solder which they handle.

Other objects are to provide pumping mechanism of simple, rugged construction which can be relied on to operate continuously through long extended periods and which withal will be of such a character as may be produced at reasonable cost.

Other desirable objects and the novel features by which the purposes of the invention are attained are set forth or will appear in the course of the following specification.

The drawings accompanying and forming part of the specification illustrate present practical embodiments of the invention. Structure, however, may be modified and changed as regards the immediate illustration, all within the true intent and broad scope of the invention as herein defined and claimed.

Figure 1 in the drawings is a broken cross sectional view of a tube finning machine incorporating features of the invention, this view being taken on a transverse plane across the soldering tank, substantially on the line 1—1 of Figure 2.

Figure 2 is a broken plan view of the apparatus.

Figure 3 is an enlarged broken vertical sectional view of the solder pump.

Figure 4 is a longitudinal vertical sectional view of the machine as on generally the plane of the line 4—4 of Figure 2.

Figures 5 and 6 are horizontal sectional views on substantially the planes of lines 5—5 and 6—6 of Figure 3.

Figure 7 is a vertical sectional detail on substantially the plane of line 7—7 of Figure 5, through the jet portion of the pump.

In Figures 1 and 4 the slitted fin strip is shown at 10 being wound upon the rotating and longitudinally advancing tubing 11.

As the finned tubing advances through the machine it passes over a tank 12, Figure 4, containing flux and then over a tank 13 containing molten solder.

Pumps 14 and 15 in these tanks spray the flux and the solder over the rotating and advancing tubing.

These pumps, as here shown, may be of substantially identical construction, consisting in each instance of a rotor disc 16, Figure 3, having radial paddle blades 17 on the under side extending inwardly from the rim of the disc to a point short of the center so as to leave an open center portion 18 in line with the central intake 19 in the bottom of the pump casing 20.

For the fluxing pump 14, Figure 4, the bottom plate 21 of the pump casing is just left with a central opening 22 to provide the pump intake.

For the solder pump, however, an intake pipe 23 is provided fixed in the opening 22 in the bottom plate and extending downward to near the bottom of the solder tank 13.

The pump casing in each instance is formed with a tangentially expanding discharge chamber 24 at the side of the rotor, at the larger end of which there is provided an upwardly inclined jet passage or nozzle 25.

The pump is supported in each instance by a tubular column 26 rising from the top of the pump casing and provided in its upper and lower ends with bearings 27, 28 for the rotor shaft 29.

The latter is shown as having a flange 30 fixedly secured thereto and bearing on top of the upper end of the column 26 to serve as a supporting thrust bearing for the shaft and rotor.

The upper end of the shaft is shown as formed with a coupling tang or key 31 detachably engaged in a companion socket or slot 32 in the lower end of a vertical drive shaft 33 and the column is shown as having a reduced portion 34 entered in a socket 35 and there adjustably and removably secured by a set screw 36.

Upon loosening this one set screw the entire pump unit can be vertically or angularly adjusted or be released and entirely removed from the supporting and driving portions of the mechanism.

Both pump units are shown carried by a base plate 37 extending forwardly over the flux and solder tanks and pivotally supported at the rear by brackets 38, Figure 2, hinging on the fixed bearings 39 in which the horizontal drive shaft 40 is journaled, Shaft 40 is shown as driving through bevel gearing 41, 42, forwardly projecting horizontal shafts 43, 44 journaled on base plate 37 and carrying at their forward ends bevel gears 45, 46 in mesh with companion gears 47, 48 on the upper ends of the vertical shafts 33 to which the pump spindles are directly coupled.

This construction enables the complete pump assembly, including both flux and solder pumps, to be lifted up and turned back clear of the flux and solder tanks by hinging the base plate upwardly around the swivel supports 39.

A post or column 49 is shown in Figures 2 and 4 supporting the forward edge of the hinged base plate 37 with a clamp nut 50 on the top of this post for accurately and firmly securing the base plate in this operative position.

At times it may be desirable to throw one or the other or both pumps out of operation. Particularly is this so of the solder pump. Accordingly, in the machine illustrated, a clutch is provided on the horizontal driving shaft 43 of the solder pump, substantially as indicated at 51 in Figures 1 and 2, which clutch can be immediately thrown at any time by means of an upstanding conveniently located clutch lever 52, Figure 4.

The pumps each have only a single operating part; that is, the short bladed open center rotor and this, like the pump casing, is of simple, rugged design, both capable of standing the action of the flux and hot solder.

The pumps are easily set at the proper angle to deliver the streams or geysers of flux and solder onto the fins of the tubing passing overhead, in the general relation shown in Figure 1. On releasing the set screw 36 the entire pump unit may be "dropped" and removed for inspection, repair or substitution of another pump unit. The operating parts of the pump may be made of acid and heat resistant metals or other materials.

The hinge mounting of the base plate 37 enables the whole pump mechanism to be lifted out of and clear of the tanks or if desirable, set at different levels in respect to the tanks.

What is claimed is:

1. Apparatus for manufacturing finned tubing comprising pumps for flux and solder, said pumps including bladed rotors operating on upright axes and open at the bottom, pump casings enclosing said rotors and open at the bottom beneath the open center rotors, said pump casings having upwardly directed jet nozzles in the top of the same, means for passing finned tubing successively over said upwardly directed jet nozzles of said flux and solder pumps, a common supporting base for said pumps, a hinge mounting for said base and drive gearing for both pumps including a common drive shaft journaled concentrically with the hinge axis of said common supporting base.

2. Apparatus for manufacturing finned tubing comprising flux and solder tanks in adjoining relation, a base hinged at one side of said tanks and extending in lowered position over the top of the same, flux and solder pumps dependent from said hinged base into said flux and solder tanks, respectively, and arranged to be lifted upwardly out of said tanks by the hinging upward of said base, drive connections for operating said pumps extending from the hinge axis of said base to said pumps and thereby arranged to permit the upward lifting movement of the base and pumps supported thereby, said pumps having upwardly directed flux and solder delivering nozzles and means for transporting tubing being finned over the tops of said tanks within the delivery range of said flux and solder pump nozzles.

EMIL A. SCHRYBER.

REFERENCES CITED

The following references are of record in the file of this patent:

UNITED STATES PATENTS

| Number | Name | Date |
|---|---|---|
| 754,939 | Rehfuss et al. | Mar. 15, 1904 |
| 1,472,719 | Horvath | Oct. 20, 1923 |
| 2,075,395 | Harmon | Apr. 6, 1937 |
| 2,152,437 | Lear | Mar. 28, 1939 |
| 2,159,297 | Shover | May 23, 1939 |
| 2,178,671 | Osborn | Nov. 7, 1939 |
| 2,263,861 | Stolper | Nov. 25, 1941 |
| 2,301,496 | Aldrich | Nov. 10, 1942 |
| 2,304,849 | Ruthman | Dec. 15, 1942 |
| 2,400,676 | Adams | May 21, 1946 |

FOREIGN PATENTS

| Number | Country | Date |
|---|---|---|
| 386,432 | Great Britain | Jan. 19, 1933 |